D. RAWSTRON.
TIRE VENTILATING DEVICE.
APPLICATION FILED SEPT. 25, 1909.
972,129.
Patented Oct. 4, 1910.
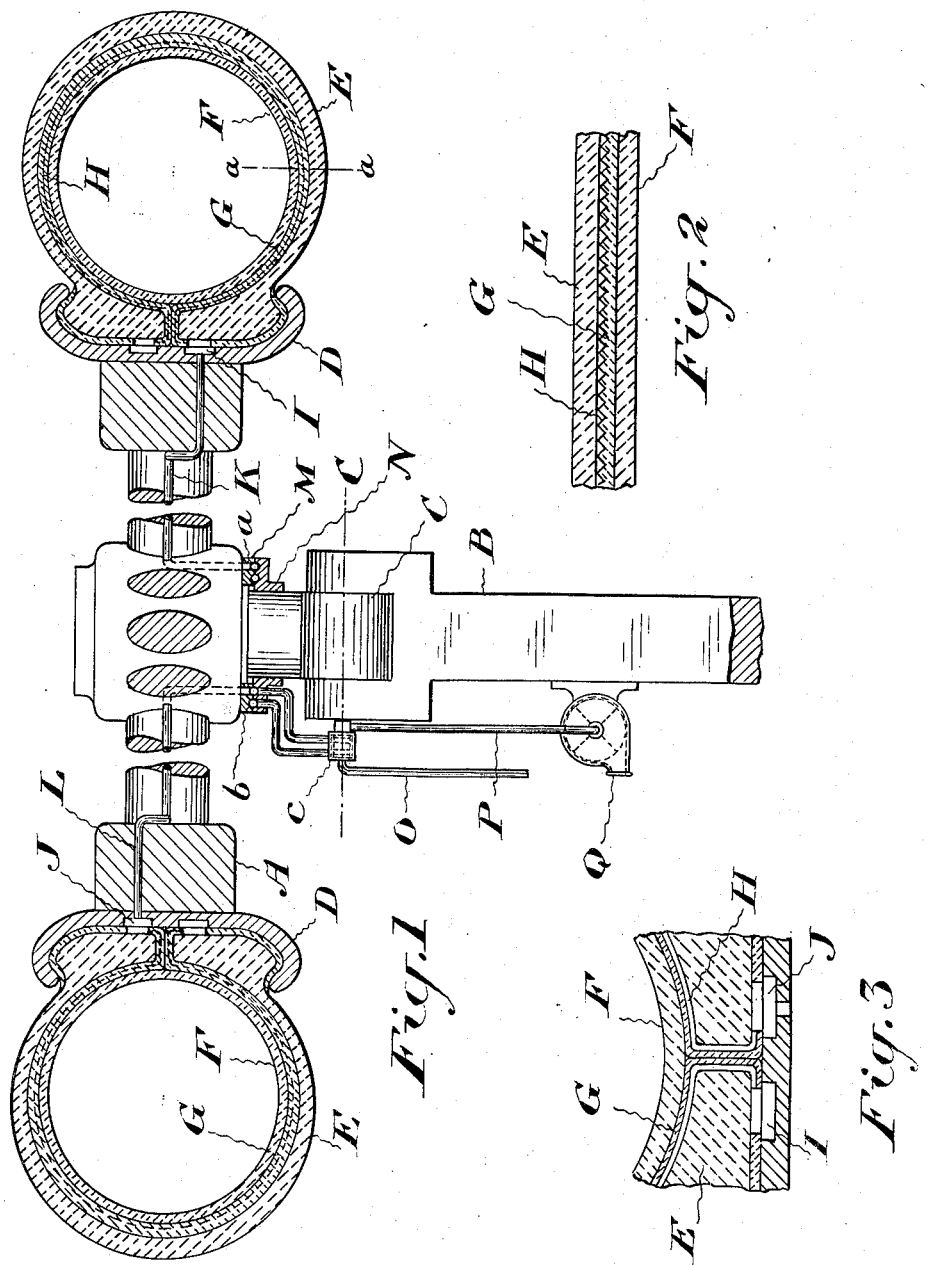
WITNESSES:
INVENTOR.
Donald Rawstron
BY Ridout & Maybee
ATTORNEYS.

UNITED STATES PATENT OFFICE.

DONALD RAWSTRON, OF CHICAGO, ILLINOIS.

TIRE-VENTILATING DEVICE.

972,129.　　　　　Specification of Letters Patent.　　Patented Oct. 4, 1910.

Application filed September 25, 1909. Serial No. 519,618.

*To all whom it may concern:*

Be it known that I, DONALD RAWSTRON, of the city of Chicago, in the State of Illinois, one of the United States of America, have invented certain new and useful Improvements in Tire-Ventilating Devices, of which the following is a specification.

It is well known that pneumatic tires have their lives considerably shortened by the heat generated by friction and my object is to devise means for continuously carrying off this heat as quickly as it is generated, thus preventing the ill results which otherwise would follow.

I attain my object by forming within the walls of the tire a large number of air channels communicating at opposite ends with separated annular channels formed in the rim on which the tire is placed and communicating respectively with an air pump and with the outer air.

Figure 1 is a cross-section of a pneumatic tire and wheel partly broken away and provided with my improved ventilating devices. Fig. 2 is an enlarged longitudinal-sectional detail of part of the tire on the line *a—a* Fig. 1, showing the fabric forming the air channels between the inner tube and cover. Fig. 3 is an enlarged sectional detail showing connection between the air channels in the tire and the annular channels in the wheel rim.

In the drawings like letters of reference indicate corresponding parts in the different figures.

A is the wheel shown partly broken away. The wheel is journaled on the axle B which is of the usual automobile steering axle type being formed in parts hinged at C. My invention is of course equally applicable to tires fitted on the rear wheels of a vehicle.

D is the wheel rim carrying the tire. The tire shown is of ordinary clencher type, being provided with the outer cover E, engaging the wheel rim in clencher fashion, and the inner tube F. Between the inner and outer tube I form air channels preferably running transversely round the tire. These channels are preferably formed by inserting between the inner tube and the cover a piece of fabric or rubber G corrugated or grooved at one side, as shown particularly in Fig. 2. The material will be stiff enough to maintain the integrity of these channels under the greatest pressure to which the tire is ordinarily subjected. These channels H are on the outer side of the fabric G which is extended along underneath the base of the outer cover.

Around the bottom of the rim are formed the annular channels I and J. To form a communication between these channels and the channels H it is necessary to stop the fabric G when its edges reach the annular channels I and J to form a communication therewith.

K and L are pipes leading respectively to the annular channels I and J. They are preferably led down between the spokes of the wheel and through the hub communicating respectively with the grooves *a* and *b* formed in the plate M secured to the hub. A similar plate N is carried by the axle B and has grooves formed therein complementary to the grooves *a* and *b*. With the grooves in the plate N connect the pipes O and P. These pipes lead respectively to the outer air and to the suction of an exhaust air pump Q. Each pipe is preferably provided with a swivel joint *c* of ordinary construction in line with the axis on which the parts of the axle swing relative to one another.

The result of this construction is that as long as the air pump Q is running air is drawn in through the pipe O, passes into the pipe K, thence into the annular channel I around the rim. Thence passing through the air channels H into the other annular channel J from whence it passes through the pipe L and pipe P to the pump Q. This constant circulation of cool air will quickly remove any heat generated in the tire either by road friction or internal friction. Of course I do not desire to restrict myself to the precise means employed by inducing the air circulation through the air channels, and other arrangements than that shown might also be devised by means of which air may be led around every portion of the tire within the walls thereof. I also desire it to be understood that any arrangement which will provide the necessary communications might be substituted for the pipes K and L.

What I claim as my invention is:—

1. The combination of a pneumatic tire having air channels formed transversely in its walls; a wheel rim having separated annular channels formed therein communicating with opposite ends of the tire channels and one communicating with the outer air; and an air pump with which the other annular channel is connected.

2. The combination of a pneumatic tire comprising an inner tube and a cover and having air channels formed between the inner tube and the cover; and means for pumping a current of air through said channels.

3. The combination of a pneumatic tire comprising an inner tube and a cover and having air channels formed transversely between the inner tube and the cover; and means for passing a current of air through said channels.

4. The combination of a pneumatic tire comprising an inner tube and a cover and having air channels formed between the inner tube and the cover; a wheel rim having separated annular channels formed therein communicating with opposite ends of the tire channels and one communicating with the outer air; and an air pump with which the other annular channel is connected.

5. The combination of a pneumatic tire comprising an inner tube and a cover; of an interlining placed between the tube and cover and provided with transverse channels in one face and means for placing opposite ends of the channels in communication with separate air tubes.

6. The combination of a pneumatic tire comprising an inner tube and a cover; of an interlining placed between the tube and cover and provided with transverse channels in one face; a wheel rim having separated annular channels formed therein communicating with opposite ends of the tire channels; and air pipes leading to said annular channels.

7. The combination of a pneumatic tire having air channels; pipes leading from said channels; a wheel carrying the rim and tire; an axle carrying the wheel; a plate carried by the wheel provided with annular grooves to which said pipes lead; a similar plate carried by the axle; and pipes leading to the grooves of the latter plate.

Dated at Toronto, this 13th day of August 1909.

DONALD RAWSTRON.

Signed in the presence of—
J. EDW. MAYBEE,
F. W. MCKENDRICK.